3,801,614
PROCESS FOR THE PRODUCTION OF β-CHLORO-
ETHYL-TRICHLOROSILANE
Dieter Lohmann, Pratteln, and Gerd Greber, Binningen,
Switzerland, assignors to Ciba-Geigy Corporation,
Ardsley, N.Y.
No Drawing. Filed Sept. 1, 1972, Ser. No. 285,769
Claims priority, application Switzerland, Sept. 3, 1971,
12,946/71
Int. Cl. C07f 7/08, 7/12
U.S. Cl. 260—448.2 E                5 Claims

ABSTRACT OF THE DISCLOSURE

A new process for the preparation of β-chloroethyl-trichlorosilane by adding hydrogen chloride to vinyl-trichlorosilane in the presence of a Lewis acid is disclosed whereby said β-chloroethyl-trichlorosilane is obtained in high yields.

---

The present invention relates to a new process for the production of β-chloroethyl-trichlorosilane, as well as to the β-chloroethyl-trichlorosilane produced by this process.

It is known from the literature that β-chloroethyl-trichlorosilane can be produced by HCl-addition, in the presence of aluminum chloride, to vinyl-trichlorosilane at normal pressure and at the reflux temperature (ca. 98 to 102° C.) [G. H. Wagner et al., Ind. Eng. Chem., 45 (1953), 367–74], by which process, however, only relatively small yields are obtained.

It has now been found that β - chloroethyl - trichlorosilane, i.e. the compound of the formula

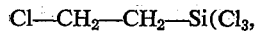

Cl—CH₂—CH₂—Si(Cl₃), can be obtained in appreciably higher yield by the addition of hydrogen chloride, in the presence of a Lewis acid and under increased pressure at a temperature of below 90° C., to vinyl-trichlorosilane.

Particularly good yields are obtained if the addition is performed under a pressure of at least 5 bar and at a temperature of between 0° C. and 60° C., and especially under a pressure of between 10 and 30 bar and at a temperature of between 0° C. and 40° C.

It is possible to use as Lewis acids in the process according to the invention the compounds known from the literature, e.g. aluminium chloride, aluminium bromide, iron(III) chloride, antimony pentachloride, antimony pentafluoride, tin tetrachloride, zinc chloride and boron trifluoride. The addition is preferably effected in the presence of aluminium chloride.

The vinyl-trichlorosilane used as starting product is known and can be obtained, for example, by a brief heating of vinyl chloride and trichlorosilane to temperatures of between ca. 550 and 580° C. with HCl-elimination, or by the addition of trichlorosilane to acetylene.

The addition according to the invention is preferably performed in a vessel which is inert to the reactants.

β-Chloroethyl-trichlorosilane is a commercially valuable product, which can be used, for example, as the starting compound for the production of active substances applicable in agrochemistry, such as active substances or agents for the regulation of plant growth.

Temperatures are expressed in degrees centigrade in the following examples.

EXAMPLE 1

An amount of 180 g. (1.11 moles) of vinyl-trichlorosilane together with 15 g. (0.11 mole) of anhydrous aluminium chloride is placed into a 300 ml. steel autoclave fitted with magnetic stirrer, thermocouple and cooling device. After a double purging of the autoclave with nitrogen, an amount of 45 g. of hydrogen chloride is injected portionwise, with stirring, until an internal pressure of 30 bar is reached. Heating is subsequently applied to raise the temperature to 50 to 60°, and this temperature is maintained for 3 hours, the consumed amount of hydrogen chloride being continuously replaced to retain a constant pressure of 30 bar. The total amount of hydrogen chloride introduced is 90 g. After cooling, the reaction product is distilled over, at room temperature and under 0.1 torr, into a cooling trap cooled to −70°, to effect the removal of the AlCl₃ catalyst, and afterwards fractionated at normal pressure through a 10 cm. Vigreux column. An amount of 206.3 g. (93.5% of theory) of β-chloroethyl-trichlorosilane is obtained; boiling point =151°; $n_D^{20}$=1.4640; $D_4^{20}$=1.4190.

Analysis for C₂H₄SiCl₄ (percent): Calculated: C, 12.13; H, 2.04; Si, 14.19; Cl, 71.64. Found (percent): C, 12.29; H, 2.01; Si, 14.62; Cl, 71.47.

NMR-spectrum: 8% solution in CDCl₃ (TMS intern.), A₂B₂-spectrum δ∼2.03 multiplet 2H (C₍α₎H₂), δ∼3.78 multiplet 2H (C₍β₎H₂).

EXAMPLE 2

In a manner analogous to that described in Example 1, a 59 ml. steel autoclave is charged with 28 g. (0.155 mole) of vinyl-trichlorosilane and 3 g. (0.022 mole) of anhydrous aluminium chloride. An amount of 5 g. of hydrogen chloride is subsequently injected so as to reach a pressure of 30 bar. The reaction mixture is then heated for 3 hours to 50 to 60°, in the process of which the internal pressure decreases to normal pressure. After processing according to Example 1, an amount of 15.5 g. (45% of theory) of β - chloroethyl - trichlorosilane is obtained.

EXAMPLE 3

In a manner analogous to that described in Example 1, an amount of 70 g. of hydrogen chloride is injected portionwise, with cooling, into a 300 ml. steel autoclave charged with 161.5 g. (1 mole) of vinyl-trichlorosilane and 13.3 g. (0.1 mole) of anhydrous aluminium chloride, the introduction of the hydrogen chloride being so regulated that the internal temperature does not exceed 25 to 30° and the internal pressure at the completion of the reaction is 30 bar. After three hours' stirring of the reaction mixture at 20 to 25°, and subsequent processing according to Example 1, an amount of 179.5 g. (92% of theory) of β-chloroethyl-trichlorosilane is obtained.

EXAMPLE 4

The process according to Example 3 is repeated, with 80 g. of hydrogen chloride being injected portionwise at 20 to 30° until a constant pressure of 30 bar is reached. The reaction mixture is subsequently heated for 1 hour to 75 to 85°; during this time the internal pressure increases to 60 bar. An amount of 148 g. (75% of theory) of β-chloroethyl-trichlorosilane is obtained.

EXAMPLE 5

The process according to Example 3 is repeated, with 130 g. of hydrogen chloride being injected portionwise, with cooling, in such a manner that the internal temperature does not exceed 0 to 2° and the internal pressure at the end of the reaction is 20 bar. The reaction mixture is subsequently stirred for 2 hours at 0°. An amount of 187.5 g. (94.6% of theory) of β-chloroethyl-trichlorosilane is obtained.

EXAMPLE 6

The process according to Example 3 is repeated, with hydrogen chloride being injected portionwise in the course of 1 hour, with cooling, the injection being so regulated that the internal temperature does not exceed 0 to 2° and the internal pressure at completion of the reaction is 10 bar. The reaction mixture is subsequently stirred for 16 hours at 0°. There is obtained an amount of 183.5 g. (92.6% of theory) of β-chloroethyl-trichlorosilane.

EXAMPLE 7

The process according to Example 3 is repeated, with hydrogen chloride being injected within 75 minutes in such a manner that the internal temperature does not exceed 0 to 2° and the internal pressure at the end of the reaction is 2 bar. After 16 hours' stirring of the reaction mixture at 0° and processing as described, an amount of 52.5 g. (26% of theory) of β-chloroethyltrichlorosilane is obtained.

EXAMPLE 8

The process according to Example 3 is repeated, with 75 g. of hydrogen chloride being injected portionwise in such a manner that the internal temperature does not exceed 40° and the internal pressure at the completion of the reaction is 30 bar. The reaction mixture is subsequently stirred for 3 hours at 40°. β-Chloroethyltrichlorosilane is obtained in practically the same yield as in Example 3.

It is also possible to use an equivalent amount of aluminium bromide in place of the aluminium chloride used in this example.

EXAMPLE 9

An amount of 10.5 g. of β-chloroethyl-trichlorosilane produced according to Example 1 is dissolved in 150 ml. of absolute diethyl ether. An addition is made at −5° to −10° of 22.7 g. of 4-chlorobenzyl alcohol within 5 minutes, and following this, in the course of 30 minutes, one of 12.6 g. of absolute pyridine dissolved in 50 ml. of absolute diethyl ether. The reaction mixture is then stirred for 18 hours with refluxing. The reaction mixture is filtered, the filtrate washed twice with water, dried, and concentrated in vacuo. There is thus obtained an amount of 23.5 g. of β-chloroethyl-tris-(4′-chlorobenzoxy)-silane, B.P. 200 to 210°/0.01 torr, $n_D^{20}=1.5636$.

Analysis.—Calculated (percent): C, 53.5; H, 4.3; Cl, 27.5; Si, 5.4. Found (percent): C, 53.4; H, 4.3; Cl, 27.8; Si, 5.6.

The obtained β-chloroethyl-tris - (4′ - chlorobenzoxy)-silane can be used, together with suitable carriers, distributing agents and, optionally, further biocidal active substances, for the production of agents for the regulation of plant growth, especially for the influencing of fruit and leaf abscission.

We claim:

1. Process for the production of the compound of the formula $$Cl-CH_2-CH_2-Si(Cl)_3$$

wherein hydrogen chloride is added in the presence of a Lewis acid, at elevated pressure and at a temperature of below 90° C., to vinyl-tirichlorosilane.

2. Process according to claim 1, wherein the addition is performed at a pressure of at least 5 bar, and at a temperature of between 0° C. and 60° C.

3. Process according to claim 2, wherein the addition is performed at a pressure of 10 to 30 bar, and at a temperature of between 0° C. and 40° C.

4. Process according to claims 1 to 3, wherein the employed Lewis acid is aluminium chloride.

5. The β-chloroethyl-trichlorosilane produced by the process according to claims 1 to 4.

References Cited

UNITED STATES PATENTS 2,728,785  12/1955  Albisetti et al. _ 260—448.2 E X
2,752,380   6/1956  Wagner et al. __ 260—448.2 E X
2,989,560   6/1961  Marsden _____ 260—448.2 E X

OTHER REFERENCES

Wagner et al., "Ind. Eng. Chem.," 45, 1953, pp. 367–74.

DANIEL E. WYMAN, Primary Examiner

P. F. SHAVER, Assistant Examiner

U.S. Cl. X.R.

424—184